United States Patent [19]

Motohashi et al.

[11] Patent Number: 5,736,797
[45] Date of Patent: Apr. 7, 1998

[54] LINEAR OSCILLATING MOTOR

[75] Inventors: Ryo Motohashi; Masao Tanahashi; Hidetoshi Amaya; Takio Maekawa; Toyokatsu Okamoto; Yasuo Ibuki, all of Hikone, Japan; Claude Oudet, Besancon; Daniel Prudham, Thise, both of France

[73] Assignee: Matsushita Electric Works, Ltd., Osaka, Japan

[21] Appl. No.: 658,825

[22] Filed: May 31, 1996

[30] Foreign Application Priority Data

May 31, 1995 [JP] Japan ................ 7-134441

[51] Int. Cl.$^6$ ................................ H02K 33/12
[52] U.S. Cl. .................. 310/36; 318/119; 318/128
[58] Field of Search ................ 310/36; 318/119, 318/126, 127, 128

[56] References Cited

U.S. PATENT DOCUMENTS

| | | | |
|---|---|---|---|
| 4,392,092 | 7/1983 | Gassner | 318/127 |
| 4,583,027 | 4/1986 | Parker et al. | 318/128 |
| 4,719,698 | 1/1988 | Ninomiya et al. | 30/43.6 |
| 5,632,087 | 5/1997 | Motohashi et al. | 30/43.92 |

FOREIGN PATENT DOCUMENTS

| | | |
|---|---|---|
| 349077 | 3/1990 | European Pat. Off. . |
| 2753749 | 6/1979 | Germany . |

Primary Examiner—Steven L. Stephan
Assistant Examiner—Judson H. Jones
Attorney, Agent, or Firm—Burns, Doane, Swecker & Mathis, L.L.P.

[57] ABSTRACT

A linear oscillating motor capable of assuring a consistent and effective feedback control of keeping a constant oscillation amplitude with varying load conditions. The linear oscillating motor comprises an oscillator carrying a permanent magnet, and a stator with an electromagnet. The electromagnet is supplied with an electric power to develop an electromagnetic drive force of moving the oscillator in a linear direction relative to the stator. A spring is provided to apply a restoring force to the oscillator for providing a linear oscillating motion to the oscillator. A photo-sensor monitors the linear motion of the oscillator and outputs a signal to a reverse-point detector which determines right and left reverse points of the oscillator. A controller applies the electric power to the electromagnet at the drive points respectively defined subsequent in time to the reverse points and in a varying amount for keeping a constant oscillation amplitude of the oscillator. The photo-sensor outputs a train of pulses appearing each time the oscillator passes its oscillation center. The reverse-point detector determines the reverse points based upon a time period between the two preceding pulses. Since the photo-sensor can monitor an oscillation cycle of the oscillator without being affected by the magnetic field developed by the electromagnet for driving the oscillator, it provides a reliable basis for accurately determining the reverse points and therefore the drive points. Accordingly, the driving force can be applied at an optimum timing to make the feedback control accurately and reliably.

8 Claims, 6 Drawing Sheets

LINEAR OSCILLATING MOTOR

BACKGROUND OF THE INVENTION

1. Field of the Invention

The present invention is directed to a liner oscillating motor, and more particularly to such linear oscillating motor with a feedback control of maintaining an oscillation amplitude at constant in a varying load condition.

2. Description of the Prior Art

European Patent Publication EP 349077 discloses a linear oscillating motor for use in a dry shaver to reciprocate a movable cutter relative to a stationary cutter. The linear motor comprises an electromagnet as a stator and a permanent magnet as an oscillator for driving the movable cutter. The electromagnet is energized by a current of a fixed frequency to drive the oscillator. When the oscillator or movable cutter experiences a heavy load during the shaving, the movable cutter moves only by a slight stroke, which reduces an oscillation amplitude with an attendant decrease in the speed of the movable cutter, thereby reducing cutting sharpness and even failing to cut the hairs. Another liner oscillating motor is proposed in U.S. patent application No. 08/413,201 to achieve a feedback control of keeping a constant oscillation amplitude with changing load condition. The control is contemplated to feed the electric power in a controlled amount at a suitable timing in order to continue the oscillation at a minimum power requirement. That is, a driving force is required to be applied to the oscillator shortly after the oscillator passes the reverse point. Therefore, the reverse points should be identified to determine a drive point of applying the driving force to the oscillator. A coil sensor is utilized to monitor the oscillation and output sinusoidal voltage from which the reverse points are identified as zero-cross points of the voltage. However, the coil sensor is likely to suffer from an external magnetic field developed around the electromagnet inherent to the linear motor and therefore may fail to give an accurate output truly indicative of the actual oscillation motion, thus making it difficult to give accurate reverse points and the drive points consistently. With this consequence, the driving force may not be applied at a desired timing. Further, it is even possible that the drive point is largely offset from a desired point by an extent that the driving force is applied to move the oscillator in the opposite direction to the direction in which the oscillator is moving, leading to uncontrolled oscillation.

SUMMARY OF THE INVENTION

The above problem has been eliminated in the present invention which provides a linear oscillating motor capable of assuring a consistent and effective feedback control of keeping a constant oscillation amplitude with varying load conditions. The linear oscillating motor in accordance with the present invention comprises a linear oscillator movably supported to a base frame and carrying a permanent magnet, and a stator fixed to the base frame and provided with an electromagnet. The electromagnet is supplied with an electric power to develop in cooperation with the permanent magnet an electromagnetic drive force of moving the oscillator in a linear direction relative to the stator. A spring is provided to apply a restoring force to the oscillator for reversing the linear motion, thus providing a linear oscillating motion to the oscillator. A sensor is included to monitor the linear motion of the oscillator and outputs a signal indicative of the linear motion. Also included in cooperation with the sensor is a reverse-point detector which, based upon the signal from the sensor, determines right and left reverse points of the oscillator. Further, there is provided a speed detector which, based upon the signal from the sensor, derives an instantaneous speed of the oscillator. A controller applies the electric power to the electromagnet at right and left drive points respectively defined subsequent in time to the right and left reverse points and in a varying amount for keeping an oscillation amplitude of the oscillator at constant. The sensor comprises a photo-sensor which outputs a train of pulses appearing each time the oscillator passes its oscillation center. The reverse-point detector determines the reverse point based upon a time period between the two preceding pulses. The photo-sensor can monitor an oscillation cycle of the oscillator without being affected by the magnetic field developed around the electromagnet for driving the oscillator and provides a basis for accurately determining the right and left reverse points and therefore the drive points. Accordingly, the driving force can be applied at an optimum timing, i.e., the drive points, which assures an accurate and reliable feedback control to give a constant oscillation amplitude under varying load conditions.

Each of right and left drive points is defined to precede an immediately following point where the oscillator reaches the oscillation center. Thus defined drive point is experimentally found to be effective for minimizing the power requirement to maintain the oscillation.

In a preferred embodiment, the reverse-point detector defines a right-side oscillation time period between the first and second of four consecutive pulses and defines a left-side oscillation time period between the second and third of the four consecutive pulses. The right-side oscillation time period corresponds to one-half cycle of the oscillator where the oscillator moves in a right-side region of the oscillation center, and the left-side oscillation time period corresponds to a subsequent half cycle of the oscillator where the oscillator moves in a left-side region of the oscillation center. The reverse-point detector determines the right reverse point as delayed from the third pulse by a one-half of the above defined right-side oscillation time period and determines the left reverse point as delayed from the fourth pulse by one-half of the above defined left-side oscillation time period. Thus, the right and left reverse points can be separately determined respectively to well reflect the motion in each half cycle, thereby enabling the feedback control more consistently with the actual oscillating motion. More particularly, even when there is deviation between the true oscillation center and the output pulse from the photo-sensor, the deviation can be well compensated by the above scheme to give reliable right and left reverse points and therefore the drive points.

Alternately, when the output pulse of the photo-sensor can be made in exact coincidence with the oscillation center, it may be sufficient to determine the reverse points in a manner as follows. A reference oscillation time period is defined by the reverse-point detector as a duration between the first and second of three consecutive pulses and therefore corresponds to one-half cycle of the oscillator. The reverse-point detector determines the right reverse point as delayed from the second pulse by a one-half of the reference oscillation time period and determines the left reverse point as delayed from the third pulse by one-half of the reference oscillation time period.

The driving force is applied to the oscillator in each half cycle and in the opposite direction to effect the feedback control in each half cycle for smooth oscillating movement. That is, the controller generates first and second drive pulses intermittently for feeding the electric power to the electromagnet in a direction of alternately changing the moving direction of the oscillator. In doing so, the controller gives a direction index indicating which one of the first and second drive pulses is to be generated subsequently. An auxiliary sensor is included to monitor the oscillatory motion of the oscillator and provide an output indicative thereof. Associated with the auxiliary sensor is a direction detector which detects a moving direction of the oscillator from the output of the auxiliary sensor. The controller includes a safe-guard circuit which allows to generate the first or second drive pulse only after the moving direction detected by the direction detector becomes coincident with a direction given by the direction index. With this safe-guard circuit, it is made to eliminate a possibility that the driving force is applied in the opposite direction to the direction in which the oscillator is moving. Such contradiction might otherwise occur when the oscillator is braked considerably for some reason. Upon this occurrence, the actual reverse point of the oscillator is delayed from the expected reverse point determined based upon the output of the photo-sensor such that the driving force would be wrongly applied in the opposite direction than intended before the oscillator passes the actual reverse point, thereby resulting in uncontrolled oscillation. Even in such condition, the safe-guard circuit inhibits the drive force from being applied to the oscillator until the oscillator passes the actual reverse point, thereby enabling to apply the drive force in the correct direction and therefore reliably recover the oscillation.

When the oscillator is unintentionally stopped or caused to be stopped due to a heavy load, a stopper circuit operates to stop the motor for safety purpose. To this end, the stopper circuit starts counting a time duration from the reverse point and resets the time duration to zero each time the detected moving direction becomes coincident with the direction index. When thus counted time duration exceeds a critical level, the stopper circuit stops feeding the electric power to deenergize the motor.

The auxiliary sensor may comprises a winding and a sensor magnet carried on the oscillator. The winding generates a sinusoidal voltage indicative of the changing moving direction in response to the movement of the oscillator.

These and still other objects and advantageous features of the present invention will be apparent from the following description of the embodiment of the present invention when taken in conjunction with attached drawings.

DETAILED DESCRIPTION OF THE EMBODIMENT

Figure 1:
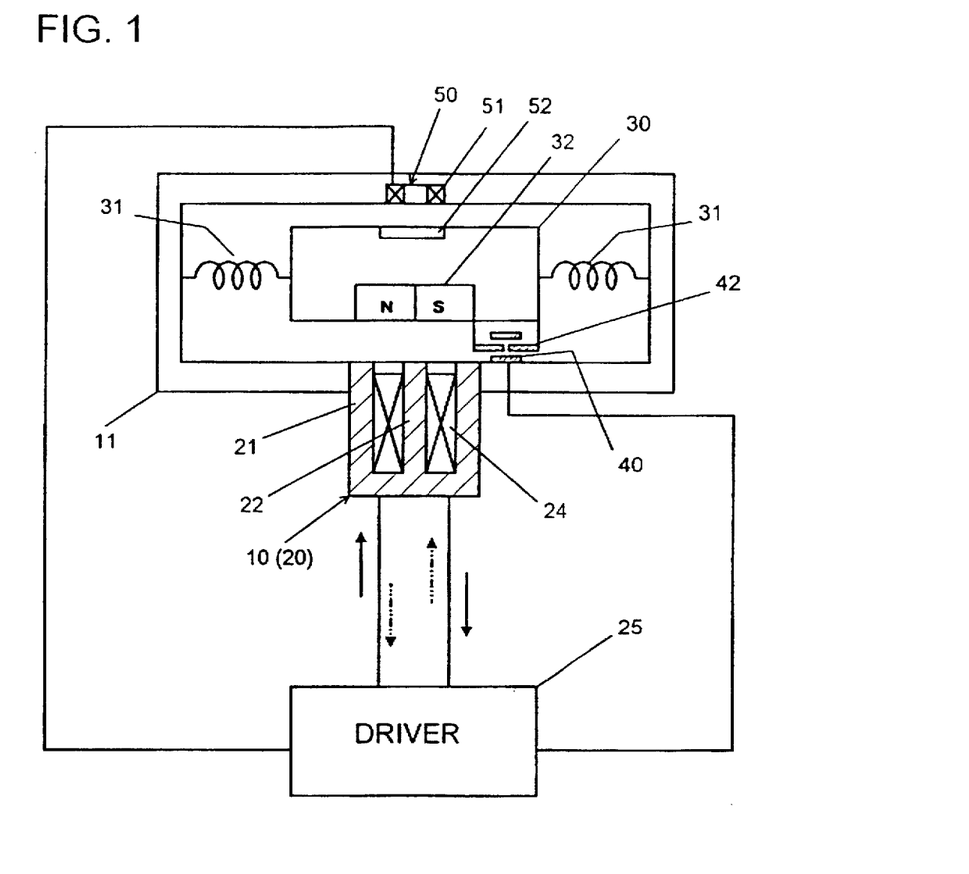
FIG. 1 is a schematic view of a linear oscillating motor in accordance with one embodiment of the present invention.

FIG. 1 illustrates schematically a basic configuration of a linear oscillating motor which comprises a stator 10 and an oscillator 30. The stator 10 is mounted to a base frame 11 and comprises an electromagnet 20 with a winding 24 around a core 22 of a yoke 21 secured to a base frame 11. A driver 25 is connected to supply an alternating electric current in a controlled amount to the electromagnet 20 in a manner as described hereinafter for control of the motor. The oscillator 30 is supported by springs 31 to the base frame 11 to be movable in a linear direction relative to the stator 10 with a small fixed clearance between a lower end face of the oscillator 30 and the upper end of the yoke 21. Carried on the oscillator 30 is a permanent magnet 32 which is magnetized to have opposite polarity ends arranged along the linear moving direction of the oscillator 30. It is this permanent magnet 32 that defines the lower end face of the oscillator 30 and is cooperative with the electromagnet 20 to receive an electromagnetic drive force for moving the oscillator 30. The springs 31 are cooperative with a horizontal component of magnetic compliance of the motor to provide an oscillation system for the oscillator 30 having a natural frequency.

Figure 2:
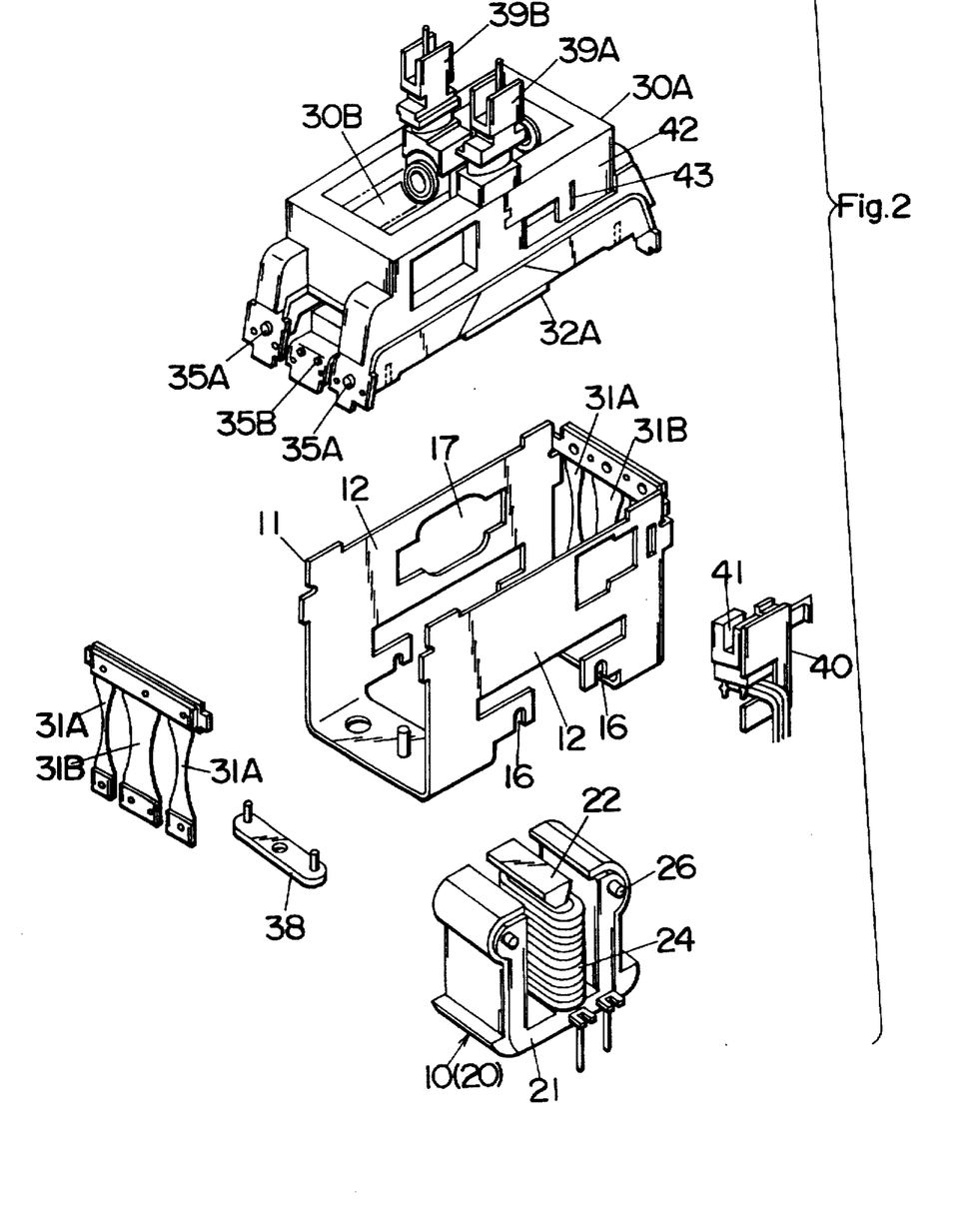
FIG. 2 is an exploded perspective view of the linear oscillating motor adapted for use in a dry shaver.
Figure 3:
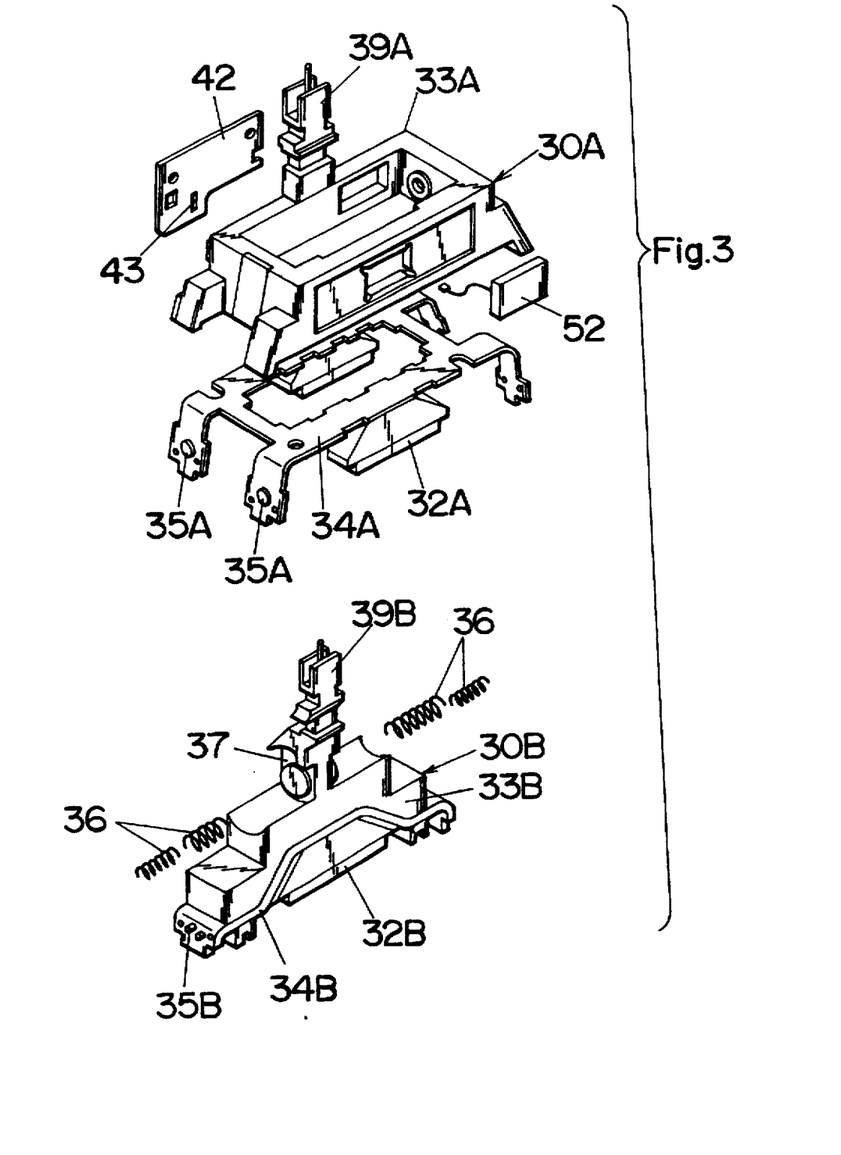
FIG. 3 is an exploded perspective view of oscillators of the motor.

FIGS. 2 and 3 illustrate one example of the motor adapted for use in a dry shaver. The electromagnet 20 is fixedly suspended from the base frame 11 by engagement of studs 26 on the yoke 21 with slots 16 at the lower end of the base frame 11. The base frame 11 carries a pair of the counter-moving oscillator 30A and 30B each provided with joints 39A and 39B for reciprocating an inner cutter (not shown) in sheafing engagement with an outer cutter (not shown) to make shaving. The oscillators 30A and 30B are suspended to the base frame 11 respectively by leaf springs 31A and 31B to be separately movable relative to the electromagnet 20. The leaf springs 31A and 31B are secured at their upper ends to the opposite upper ends of the base frame 11 and at their lower ends to the opposite lower ends of the oscillators 30A and 30B so that the oscillator 30A and 30B are movable between opposite side walls 12 of the base frame 11. The oscillators 30A and 30B are each provided with the permanent magnet 32A and 32B which are opposed to the upper pole end face of the electromagnet 20. As shown in FIG. 3, the oscillators 30A and 30B comprise plastic-made carrier 33A and 33B respectively having integrally molded-in metal skeletons 34A and 34B which gives rigidity to the oscillators and are formed respectively with connections 35A and 35B to the leaf springs 31A and 31B. The one carrier 33A is in the form of a rectangular open frame into which the other carrier 33B is disposed with coil springs 36 interposed between a center post 37 of the carrier 33B and opposed end walls of the rectangular carrier 33A. The coil springs 36 are cooperative with the corresponding leaf spring 31A and 31B to give restoring forces which counteract the magnetic driving force intermittently developed by the electromagnet 20 for establishing the oscillation system. The carriers 33A and 33B are interlocked by means of a link 38 pivotally supported to the base frame 11 so that the oscillators 30A and 30B oscillate synchronously in counter directions.

Now, discussion is made to a feedback control which is included in the motor to keep a constant oscillation amplitude of the oscillator 30 against possible varying load conditions. The oscillation of the oscillator is constantly monitored by combination of a photo-sensor 40 and a coil sensor 50. The photo-sensor 40 is held on the base frame 11 and is cooperative with a sensor plate 42 fixed to the carrier 33A, i.e., the oscillator 30A to output a signal indicating oscillation center and speed of the oscillator. The sensor plate 42 has a slit 43 and is located in a groove 41 of the photo-sensor 40 so that, each time the slit 48 traverses a light path in the groove, the photo-sensor 40 responds to issue a pulse. The photo-sensor 40 is arranged to output the pulse each time the slit 48, i.e., the oscillator 30 passes across its oscillation center. Consequently, it is capable of detecting the oscillation center of the oscillator 30 from timing at which the pulse is output and also of detecting speed of the oscillator from the width of the pulse. The coil sensor 50 comprises a sensor winding 51 which is fitted in an opening 17 of the base frame 11 on opposite of the photo-sensor 40 and is cooperative with a sensor magnet 52 embedded in the center of the oscillator 30A to give a sinusoidal voltage signal as the oscillator 30 oscillates. The output voltage from the coil sensor 50 is therefore indicative of an instantaneous direction in which the oscillator 30 is moving. A Hall effect device may be utilized instead of the sensor winding to give the same sinusoidal output.

Figure 4:
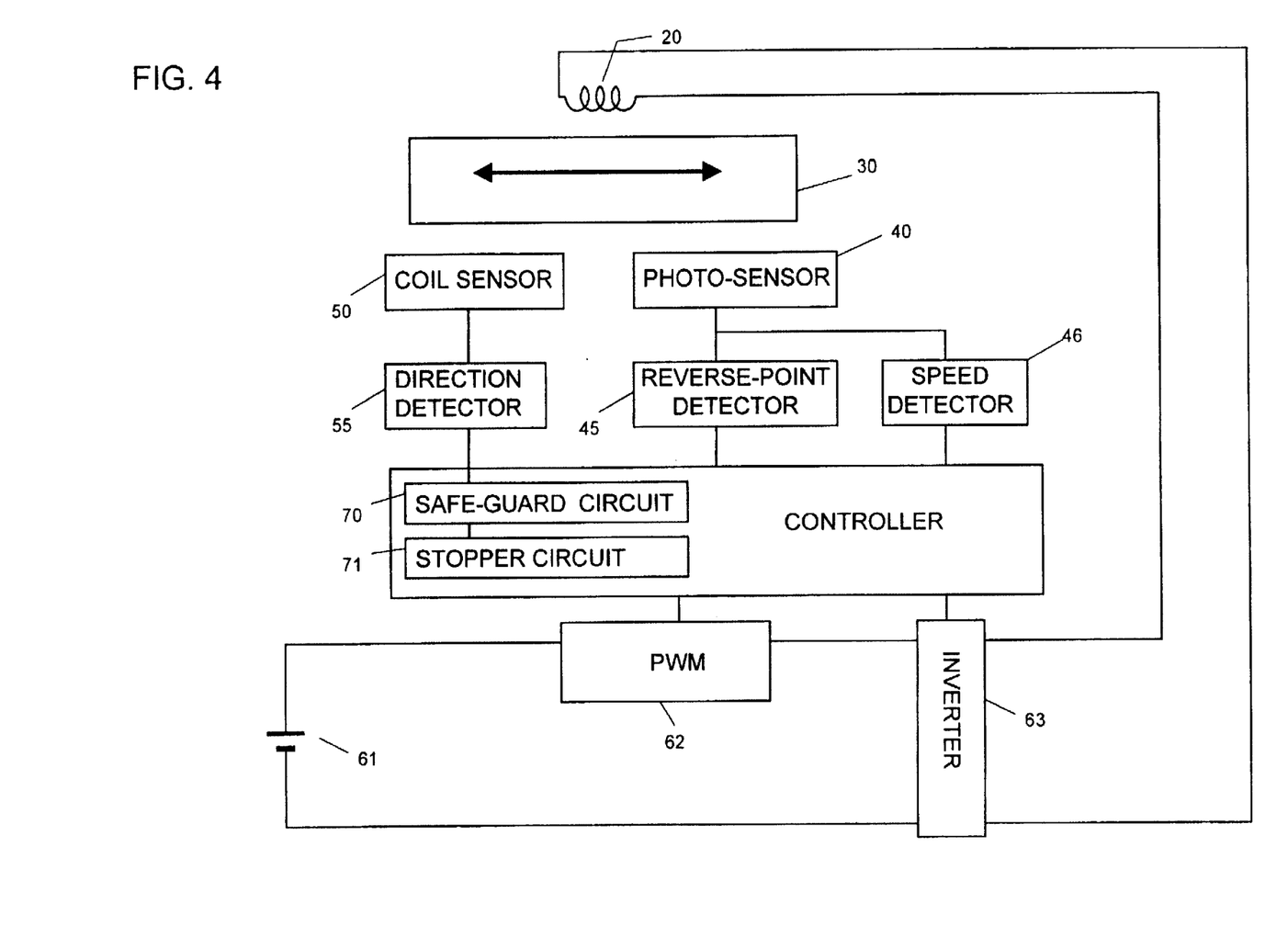
FIG. 4 is a block diagram illustrating a circuit of the motor.

The details of the feedback control is now discussed with reference to FIGS. 4 and 5. A controller 60 is provided to effect the feedback control based upon the outputs from the photo-sensor 40 and the coil sensor 50 for varying a time of supplying the electric current from a power source 61 to the electromagnet 20 through an inverter 63 in order to keep a constant oscillation amplitude. The controller 60 is connected to a pulse width modulator (PWM) 62 and the inverter 63 to vary a pulse-width of a drive pulse for feeding the electric current and to alternate the direction of the electric current being fed to the electromagnet 20. The feedback control becomes operative in a short time after the motor is started. At the start of the motor, the controller 60 allows to generate a few initial drive pulses of a fixed width at a fixed timing calculated in view of the natural frequency of the oscillator 30, until the oscillator 30 reaches a stable oscillation where a predetermined oscillation amplitude is accomplished. Thereafter, the controller 60 becomes responsible for determining a correct drive point of supplying the electric current in each half cycle of the oscillation as well as for varying the time of supplying the electric current, i.e., the pulse width of the drive pulse to keep the constant oscillation amplitude. Through simulation tests, it is found that the drive points of applying the electric current are preferred to be immediately after the oscillator passes through its right and left reverse points. The drive points can be therefore defined to delay from the right and left reverse points PR and PL by a fixed short time period TX. The reverse points are determined based upon the output from the photo-sensor 40.

Figure 5:
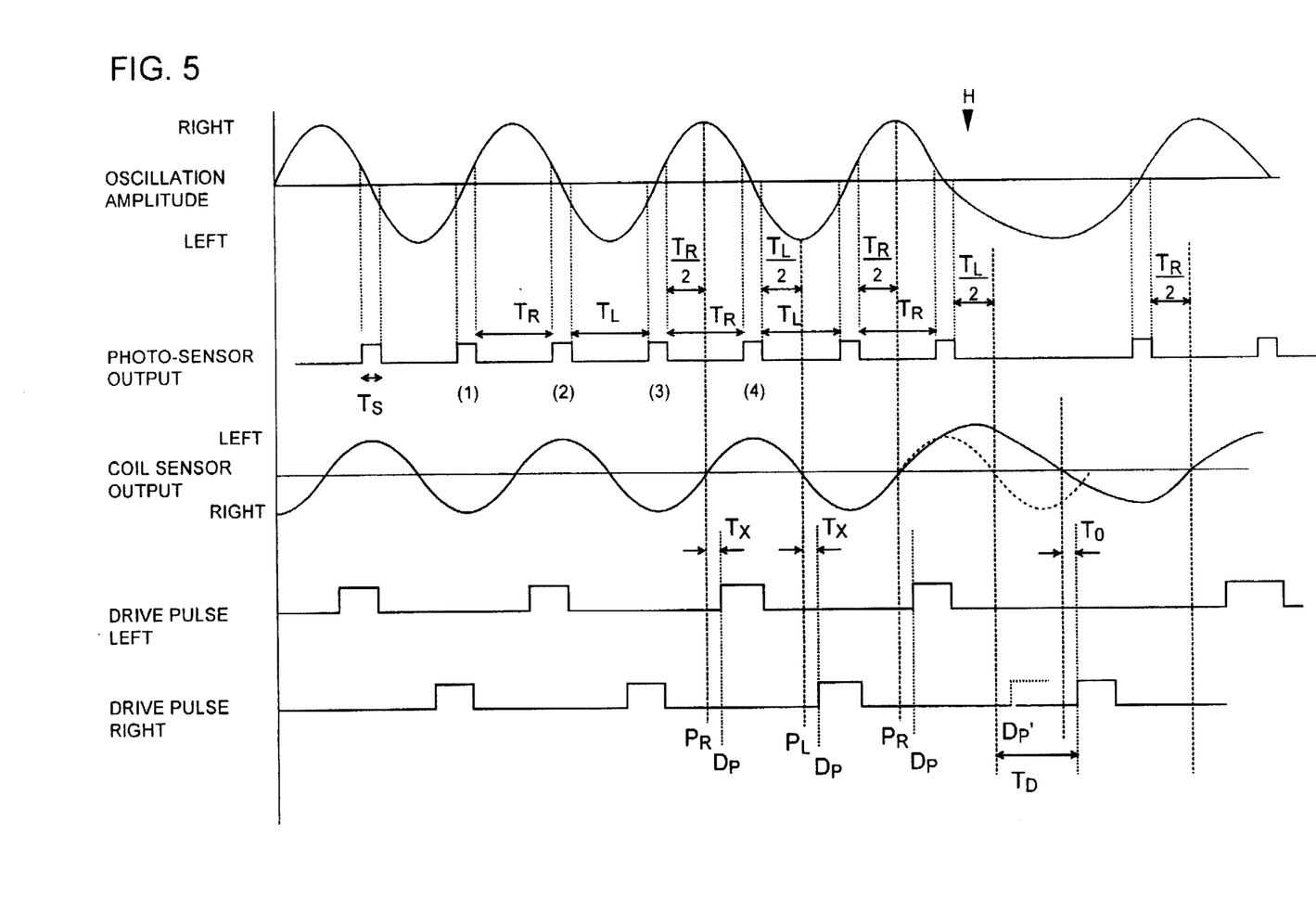
FIG. 5 is a chart illustrating a scheme of feedback control for the motor.

During the stable oscillation, the photo-sensor 40 outputs a train of the pulses which, as shown in FIG. 5, appear at the timing where the oscillator 30 passes across the oscillation center with a pulse width corresponding to an instantaneous speed of the oscillator 30. The output of the photo-sensor 40 is fed to a reverse-point detector 45 which expects a next reverse point from the preceding pulses detected. In order to determine the next right reverse point PR, three preceding pulses (1) to (3) are taken into the detector 45 to give a right-side oscillation time TR period between the first and second of the three preceding pulses. The right-side oscillation time period TR is meant to denote one-half cycle of the oscillator where the oscillator 30 moves in a right-side region of the oscillation center. Then, the right reverse point PR is determined to delay from the third pulse (3) by one-half of the right-side oscillation time period TR/2. In the like manner, the next left reverse point PL is determined at the detector 45 by taking three preceding pulses (2) to (4) to give a left-side oscillation time period TL between the second and third of the three preceding pulses as indicative of the subsequent half cycle of the oscillator where the oscillator moves in a left-side region of the oscillation center. Then, the left reverse point PL is determined to delay from the third pulse (4) by one-half of the left-side oscillation time period TL/2. Based upon thus obtaining right and left points PR and PL, the controller 60 determines subsequent driving points DP of applying the drive pulse as delayed therefrom by the fixed time Tx.

Also during the stable oscillation, the output of the photo-sensor 42 is fed to a speed detector 46 which detects the instantaneous speed of the oscillator 30 moving across the oscillation center as a function of the width TS of the pulse from the photo-sensor 42. The detected speed is taken into the controller 60 which in turn varies the width of the drive pulse of feeding the electric current to the electromagnet 20 in a feedback manner so as to keep the constant oscillation amplitude. For consistent feedback control of varying the electric power in correspondence to the moving direction of the oscillator 30, the compensation of the amount of the electric current for the oscillator moving in a given direction is based upon the detected speed of the oscillator moving in the same direction. That is, when the oscillator 30 is moving left, the feedback control is based upon the detected speed of the oscillator moving from right to left and vice versa.

With the provision of the above scheme of determining the right and left reverse points individually based upon the right-side oscillation time period TR and the light-side oscillation time period TL, the reverse points can be accurately determined even when the output pulse of the photo-sensor 40 is not exactly coincidence with the oscillation center of the oscillator, for example, where the slit 43 of the sensor plate 42 at the oscillation center is out of center, or deviated from the light path of the photo-sensor 40 to thereby cause the photo-sensor to output the pulse at the timing offset from the oscillation center.

The controller 60 is arranged to generate the drive pulses in order to alternately change the polarity of the electric current being fed to the electromagnet 20. That is, the controller 90 outputs first (right) and second (left) drive pulses respectively for moving the oscillator 30 right and left. However, a safe-guard is preferred to be included in the controller 60 to check the instantaneous moving direction of the oscillator for generating the correct drive pulse for adding the drive force to the oscillator 30 in the same direction in which the oscillator is moving. This is particularly advantageous to keep the oscillation even when an external force is applied to impede the oscillation in such a manner as to prolong the oscillation cycle unduly beyond an expected variation. When such abnormal condition is met, a control would otherwise cause the driving force to be applied in the opposite direction than intended, thereby failing to keep the oscillation. In order to avoid the problem and to give a consistent recovery of the oscillation, a safe-guard circuit 70 is preferred to be included in the controller 60 to verifies the direction in which the next drive force is applied to move the oscillator 30 and the actual moving direction of the oscillator 30. A direction detector 55 is provided to give the actual moving direction of the oscillator 30 from the sinusoidal output voltage of the coil sensor 50. The controller 60 generates a direction index indicating which one of the first (right) and second (left) drive pulses is to be issued for the subsequent addition of the driving force. The safe-guard circuit 70 allows the controller 60 to generate the first (right) or second (left) drive pulse only after the detected moving direction by the direction detector 55 becomes coincident with the direction given by the direction index.

Operation of the safe-guard circuit 70 is explained with reference to the right-hand side of FIG. 5. When a heavy load is applied at a point H in a direction of prolonging the oscillation cycle, the voltage output from the coil sensor 50 is correspondingly modulated to have an prolonged cycle. Even in this abnormal condition, the controller 60 would respond to generate the right drive pulse at an expected drive point DP' where the oscillator 30 is normally expected to have changed its direction from left to right as indicated a by dotted line but where the oscillator 30 is actually still moving left as indicated by a solid line. At this moment, however, the safe-guard circuit 70 verifies the actual moving direction, i.e., left with the direction index, i.e. right, and inhibits the controller 60 from giving the right drive pulse until the direction detector 55 issues the output indicating that the actual moving direction is changed from left to right. For reliably determining the change of direction from the output of the coil sensor 50, the detector is arranged to acknowledge the change of direction short time TO after a zero-crossing of the output voltage of the coil sensor 50. In this manner, the driving force can be applied at a correct timing to recover the oscillation even when the oscillator suffers from the heavy load.

Further, the controller may includes a stopper circuit 71 which stops feeding electric power when the oscillator 30 is caused to stall substantially under a heavy load, i.e., when the drive pulse is not generated over a predetermined critical time period from the last expected reverse point PR' or PL'. That is, the direction change of the oscillator 30 is not available from the output of the coil sensor 50 over the predetermined time period from the expected reverse point PR' or PL'. The stopper circuit 71 starts counting a time duration TS from the expected reverse point PR' or PL' and resets it to zero each time the detected moving direction becomes coincident with the direction index. When thus counted time duration TD exceeds the critical time period, the stopper circuit 71 causes the controller 60 to stop feeding the electric current to the electromagnet 20, thereby stop operating the motor.

Figure 6:
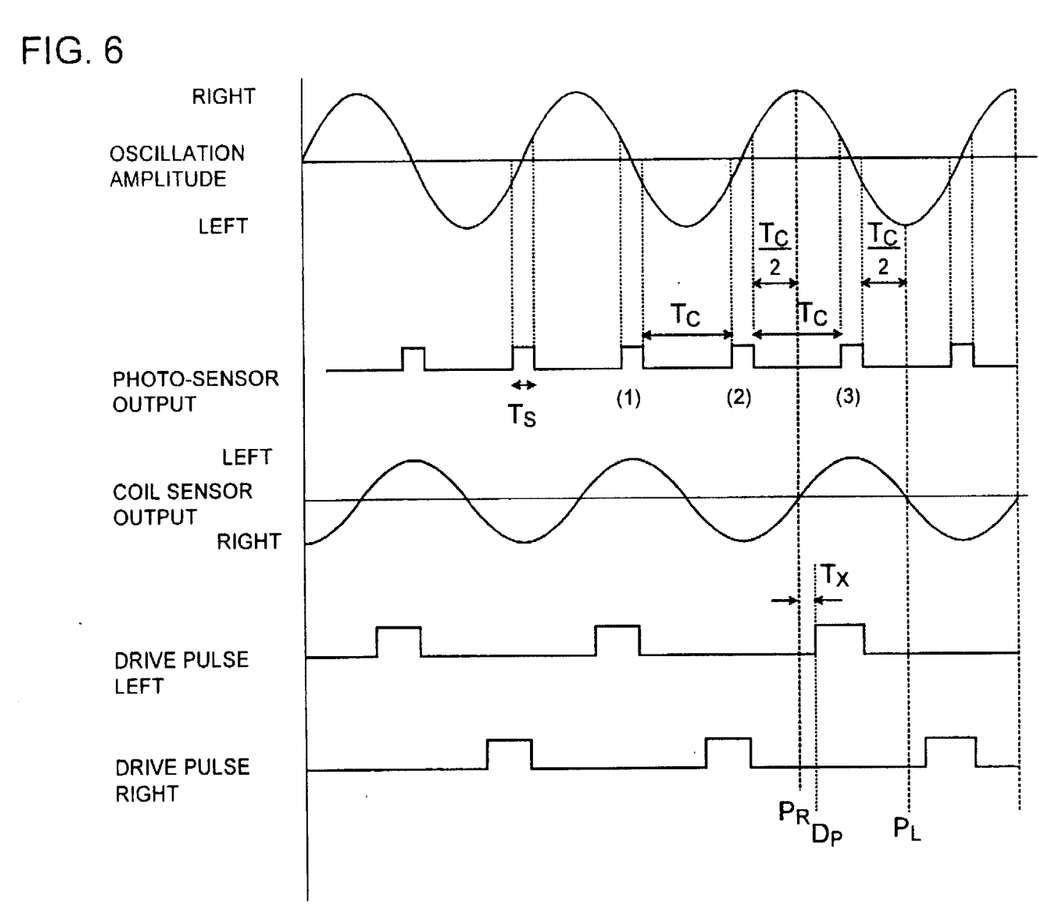
FIG. 6 is a chart illustrating another scheme of the feedback control of the motor.

In the above embodiment, the right and left reverse points PR and PL are defined respectively from the preceding right-side oscillation time period TR and from the left-side oscillation time period TL in order to compensate for deviation between the output pulse from the photo-sensor and the actual oscillation center of the oscillator 30. However, in case where the photo-sensor 40 can be correctly centered with the slit 43 of the sensor plate 42 on the oscillator 30, the right and left reverse points can be simply determined by the preceding two output pulses from the photo-sensor, as shown in FIG. 6. That is, the preceding pulses are taken to give a common oscillation time period TC so that the next reverse point PR and PL is determined to delay from the last pulse by one-half of the time period TC/2. In this instance, the instantaneous speed detected as a function of the pulse width TS is utilized to vary the time of subsequently applying the electric current to the electromagnet for keeping the constant oscillation amplitude.

In the above embodiment, the feedback amount is calculated from the detected speed of the oscillator 30. However, it is equally possible to utilize an acceleration of the oscillator for the same feedback purpose. In this sense, the term "speed" utilized throughout the description and claims should be understood to encompass the meaning of "acceleration". Further, the electromagnet and the permanent magnet may be given to the oscillator and the stator without departing the scope of the invention.

What is claimed is:

1. A linear oscillating motor comprising:
   a linear oscillator movably supported to a base frame and carrying a permanent magnet;
   a stator fixed to said base frame and provided with an electromagnet, said electromagnet receiving an electric power to develop in cooperation with the permanent magnet an electromagnetic drive force of moving said oscillator in a linear direction relative to said stator;
   spring means which applies a restoring force to said oscillator for reversing the linear motion, thereby providing a linear oscillating motion to said oscillator;
   sensor means for sensing the linear motion of the oscillator to provide a signal indicative thereof;
   a reverse-point detector which, based upon the signal from said sensor means, determines right and left reverse points of said oscillator;
   a speed detector which, based upon the signal from said sensor means, derives an instantaneous speed of said oscillator;
   a controller which applies the electric power to said electromagnet at right and left drive points respectively defined subsequent in time to said right and left reverse points and in an a varying amount for keeping an oscillation amplitude of the oscillator at constant,
   wherein said sensor means comprises:
   a photo-sensor which outputs a train of pulses appearing each time said oscillator passes its oscillation center, and wherein
   said reverse-point detector determines said reverse point based upon a time period between two preceding pulses.

2. The linear oscillating motor as set forth in claim 1, wherein each of said right and left drive point is defined to precede immediately following point where said oscillator reaches a center of the oscillation.

3. The linear oscillating motor as set forth in claim 1, wherein
   said reverse-point detector defines a right-side oscillation time period between the first and second of four consecutive pulses and defines a left-side oscillation time period between the second and third of said four consecutive pulses, said right-side oscillation time period corresponding to one-half cycle of the oscillator where said oscillator moves in a right-side region of the oscillation center, said left-side oscillation time period corresponding to a subsequent half cycle of the oscillator where said oscillator moves in a left-side region of the oscillation center; and wherein
   said reverse-point detector determines said right reverse point as delayed from said third pulse by a one-half of said right-side oscillation time period and determines said left reverse point as delayed from the fourth pulse by one-half of said left-side oscillation time period.

4. The linear oscillating motor as set fort in claim 1, wherein
   said reverse-point detector defines a reference oscillation time period between the first and second of three consecutive pulses, said reference oscillation time period corresponding to one-half cycle of the oscillator, and wherein
   said reverse-point detector determines said right reverse point as delayed from said second pulse by a one-half of said reference oscillation time period and determines said left reverse point as delayed from the third pulse by one-half of said reference oscillation time period.

5. The linear oscillating motor as set forth in claim 1, wherein
   said controller generates first and second drive pulses intermittently for feeding said electric power to the electromagnet in a direction of alternately changing the moving direction of said oscillator;

said controller generating a direction index indicating which one of the first and second drive pulses is to be generated subsequently;

said motor including auxiliary sensing means which monitors the oscillatory motion of the oscillator to provide an output indicative thereof; and wherein a direction detector is provided to detect from the output of said auxiliary sensing means a changing moving direction of the oscillator; and said controller including a safe-guard circuit which allows to generate the first or second drive pulse only after the moving direction detected by said direction detector becomes coincident with a direction given by said direction index.

6. The linear oscillating motor as set forth in claim 5, wherein said controller includes a stopper circuit which starts counting a time duration from the reverse point and resets the time duration to zero each time the detected moving direction becomes coincident with the direction index, and stops feeding the electric power when the time duration exceeds a predetermined critical level.

7. The linear oscillating motor as set forth in claim 5, wherein said auxiliary sensing means comprises a winding mounted to said base frame and a sensor magnet carried on said oscillator, said winding generating a sinusoidal signal indicating said changing moving direction in response to the movement of the oscillator.

8. The linear oscillating motor as set forth in claim 5, wherein said auxiliary sensing means comprises a Hall effect device mounted to said base frame and a sensor magnet carried on said oscillator, said Hall effect device generating a sinusoidal signal indicating said changing moving direction in response to the movement of the oscillator.

* * * * *